US008505109B2

(12) United States Patent
Jähnke et al.

(10) Patent No.: US 8,505,109 B2
(45) Date of Patent: Aug. 6, 2013

(54) MEASURING PROBE DEVICE FOR A PROBE MICROSCOPE, MEASURING CELL AND SCANNING PROBE MICROSCOPE (75) Inventors: Torsten Jähnke, Berlin (DE); Torsten Müller, Berlin (DE); Kathryn Anne Poole, Berlin (DE); Detlef Knebel, Berlin (DE)

(73) Assignee: JPK Instruments AG, Berlin (DE)

( * ) Notice: Subject to any disclaimer, the term of this patent is extended or adjusted under 35 U.S.C. 154(b) by 510 days.

(21) Appl. No.: 12/670,561

(22) PCT Filed: Jul. 24, 2008

(86) PCT No.: PCT/DE2008/001202
§ 371 (c)(1),
(2), (4) Date: Jun. 21, 2010

(87) PCT Pub. No.: WO2009/012765
PCT Pub. Date: Jan. 29, 2009

(65) Prior Publication Data
US 2010/0263096 A1 Oct. 14, 2010

(30) Foreign Application Priority Data
Jul. 24, 2007 (DE) .................. 10 2007 034 853

(51) Int. Cl.
G01Q 30/14 (2010.01)
(52) U.S. Cl.
CPC .................... *G01Q 30/14* (2013.01)
USPC ........................................................ 850/15
(58) Field of Classification Search
USPC ........................................................ 850/15
See application file for complete search history.

(56) References Cited

U.S. PATENT DOCUMENTS

| 4,935,634 | A | 6/1990 | Hansma et al. |
| 6,032,518 | A | 3/2000 | Prater et al. |
| 7,001,740 | B2 | 2/2006 | Duffy et al. |
| 8,037,739 | B2 * | 10/2011 | Ota et al. ................ 73/53.01 |
| 2005/0199047 | A1 | 9/2005 | Adams et al. |
| 2008/0072665 | A1 | 3/2008 | Struckmeier et al. |

FOREIGN PATENT DOCUMENTS

| DE | 10324397 A1 | 1/2005 |
| JP | 2007-132781 A | 5/2007 |
| WO | 2006-040025 A1 | 4/2006 |

OTHER PUBLICATIONS

International Search Report, directed to PCT/DE2008/001202, mailed on Feb. 25, 2009, 5 pages.

* cited by examiner

*Primary Examiner* — Jack Berman
(74) *Attorney, Agent, or Firm* — Smith Patent Office (57) ABSTRACT

The invention relates to a measuring probe device for a probe microscope, in particular a scanning probe microscope, with a measuring probe holder and a measuring probe arranged on the measuring probe holder, which is set up for a probe microscopic investigation of a sample, wherein on the measuring probe holder, a measuring probe chamber is formed, which receives the measuring probe at least partially and is open on a side away from the measuring probe holder, and is configured to receive a liquid surrounding the measuring probe. The invention also relates to a measuring cell for receiving a liquid sample for a probe microscope, a scanning probe microscope with a measuring probe device and a scanning probe microscope with a measuring cell.

13 Claims, 5 Drawing Sheets

MEASURING PROBE DEVICE FOR A PROBE MICROSCOPE, MEASURING CELL AND SCANNING PROBE MICROSCOPE

The invention relates to a measuring probe device for a probe microscope, in particular a scanning probe microscope, a measuring cell for receiving a liquid specimen for a probe microscope and a scanning probe microscope.

BACKGROUND OF THE INVENTION

Scanning probe microscopy (SPM) is a measurement and analysis technique in which a measuring probe is scanned over a specimen of a measurement medium to be analysed and in which the topography of the specimen is determined from a distance-dependent interaction between the measuring probe and the specimen. However, material constants or other information about the specimen can also be obtained. The most prominent representatives of this technique are the atomic force microscope (AFM) and the scanning tunnelling microscope (STM). Further representatives of this technique are in particular the scanning near-field microscope (SNOM) and the scanning photonic force microscope (SPFM).

To measure the distance-dependent interaction between measuring probe and specimen, in distance spectroscopy the measuring probe is displaced relative to the surface of the specimen, for example in a direction perpendicular to the specimen surface, and the interaction between measuring probe and specimen is measured. Alternatively the specimen can also be moved. A relative movement between measuring probe and specimen can also be provided, with both the measuring probe and the specimen being moved. In scanning probe microscopy, this distance spectroscopy is utilized for measuring the interaction between measuring probe and specimen, for example in order to measure forces between molecules, in which one molecule binds to the measuring probe and another molecule binds to the specimen.

It is then possible to measure the interaction between the two bound molecules. However, it is also possible to measure intramolecular forces, for example by lowering the measuring probe onto the specimen and waiting for binding to occur. Then the measuring probe can be moved away from the specimen again, recording the forces acting on the measuring probe.

Furthermore, other measurements are possible, in which an interaction is measured that correlates with an assigned distance from two or more positions.

The measuring probe used in atomic force microscopy is usually a component, also called a cantilever, consisting of a bending beam and/or optionally provided with a pyramid-shaped tip. Without restricting generality, this is referred to as a cantilever in the following explanations. The explanations apply correspondingly to other forms of measuring probes in scanning probe microscopy.

For distance spectroscopy, the use of both untreated and pretreated cantilevers is known. In the case of an untreated cantilever, binding of the specimen during measurement is nonspecific. For example, it is then a case of pulling molecules out of their surrounding medium by binding to the cantilever, in order to measure the interaction of the molecules with the surrounding medium. In this case, however, the molecules on which they are pulled can also be characterized more precisely. For instance, DNA molecules display a specific spectroscopy curve owing to an internal conformational change. Another field of application is measurement of viscoelasticity on deformable materials such as biopolymers and living biological cells, to determine the so-called stiffness.

With a pretreated cantilever, it is possible in particular to analyse specific binding. Such an analysis can be advantageous when the formation of unwanted bonds, which it is then in some circumstances barely possible to separate from one another, should be prevented during measurement. Thus, it is regular practice to bind one or more molecules to the measuring probe in the form of a cantilever, which then forms a receptor-ligand system with the bound molecule or molecules. Binding of cells to a measuring probe in the form of a cantilever and causing this system to interact with a specimen, for example a biomaterial, or with other cells, is also known. Pretreatments of measuring probes, in particular of cantilevers, are known in various implementations, for example in the form of hydrophobization of the measuring probe.

Another form of coating of the cantilever is the gluing-on of artificial particles, for example glass beads and polystyrene beads, which can in their turn be enveloped in cells or other coatings. By using adhesives, the binding of the beads to the cantilever is very strong, and far greater than the binding of particles to the cantilever via the receptor-ligand system.

Known possibilities for pretreatment of the cantilever generally result in coating of the measuring probe, at least in partial regions. Thus, a cell applied to the cantilever coats a partial region of the cantilever surface. It is possible, within the scope of the pretreatment, first to provide the cantilever with a coating, in particular an adhesion-promoting coating, on which a substance to be measured is then applied. In the following, the material applied to the measuring probe, in particular the cantilever, within the scope of pretreatment is generally called the probe substance, whether it is a single material or a combination of several materials, comprising for example an adhesion-promoting base and a substance that is to be analysed, arranged thereon. A (basis) coating applied within the scope of the pretreatment and included in the probe substance is also called a probe coating.

An important field of application of scanning probe microscopy is the life sciences area—the analysis of biological specimens, preferably in aqueous fluids. Owing to the relatively high surface tension of these fluids, definite forces act on the cantilever and adherent particulate coatings, when the probe is immersed in or withdrawn from the liquid. This can even lead to irreversible deformation of the cantilever. Only if a particle is fixed very firmly to the cantilever, for example with adhesives, the specimen space can often be changed without losses. The term particle is used very generally—it refers to artificial, biological or biogenic objects in the submicrometre to submillimetre range. They can be of spherical or irregular shape. Particles that are frequently used are for example glass beads, silica beads, polymer beads and biological cells or cell clusters.

In known designs of cantilever holders, a microparticle that is only fixed moderately on the tip, for example via biotin/streptavidin bonds, is pulled off when the cantilever is lifted out of a fluidic chamber or is immersed into it again. As a result, the repeated use of a measuring probe in different measuring chambers is far more difficult or even impossible. If the measuring probe is to be used for further analyses after the probe microscopic measurement, this is almost impossible. For carrying out further measurements on different specimens with one measuring probe, it would be very useful if the forces on the measuring probe, induced by the surface tension, could be minimized.

Hitherto, the coatings only altered the chemical surface properties of the cantilever, to improve or prevent attachment of molecules and particles. In addition to reduced mechanical loading of the cantilever, it would be important to minimize the risk of denaturation, which for example means avoiding evaporation and may possibly require temperature control. As we also wish to observe living systems, deliberate alteration of the surface tension properties of liquids is only possible to a limited extent.

SUMMARY OF THE INVENTION

The problem to be solved by the invention is to provide a measuring probe device for a probe microscope, in particular a scanning probe microscope, and a measuring cell for receiving a liquid specimen for a probe microscope, with which operation of the probe microscope that is more efficient in terms of consumption is made possible.

This problem is solved with a measuring probe device for a probe microscope according to independent claim 1 and a measuring cell for receiving a liquid specimen for a probe microscope according to independent claim 13. Furthermore, a scanning probe microscope with the measuring probe device and a scanning probe microscope with the measuring cell according to claims 18 and 19 are created. Advantageous embodiments are the object of dependent subclaims.

The invention comprises the idea of a measuring probe device for a probe microscope, in particular a scanning probe microscope, with a measuring probe holder and, arranged on the measuring probe holder, a measuring probe, which is set up for probe microscopic analysis of a specimen, with a measuring probe chamber formed on the measuring probe holder and at least partially receiving the measuring probe and open on a side turned away from the measuring probe holder, and configured to receive a liquid that surrounds the measuring probe.

The invention further comprises the idea of a measuring cell for receiving a liquid specimen for a probe microscope, in particular a scanning probe microscope, in which several measuring cell chambers are formed in an internal space, surrounded by an outer wall, and are separated from one another by one or more partitions, the one or more partitions having a smaller overall height than the outer wall.

With the invention, the physical loads on a measuring probe for probe microscopic analysis in liquids, when entering and leaving the specimen space, are reduced. As a result, the service life of the measuring probe is increased, and an increased specimen throughput becomes possible. In particular embodiments, not only the loading of the measuring probe is reduced, but also separate holding of the measuring probe for subsequent analyses becomes possible.

In a particular embodiment of the invention, the measuring probe chamber has a sleeve structure. In one embodiment, the measuring probe is arranged completely or partially in the sleeve structure. In one embodiment, the sleeve structure is designed so that liquid breakaway during withdrawal of the measuring probe from a liquid is attenuated. The sleeve structure is then configured to lessen the action of surface forces in liquid breakaway. Overall, this can ensure gentle withdrawal from and insertion into the liquid in which the specimen is contained.

An advantageous embodiment of the invention envisages configuration of the measuring probe chamber to form, with the liquid that is to be received, a liquid bell that surrounds the measuring probe. For example, the sleeve structure is designed to form the liquid bell. As a result, the measuring probe can be removed from a liquid or inserted into it gently.

In a further development of the invention, it can be envisaged that segments of the wall of the measuring probe chamber are made at least partially of a flexible material.

One embodiment of the invention envisages that segments of the wall of the measuring probe chamber have an at least partially hydrophilic surface coating at least on an inside surface.

A preferred embodiment of the invention can envisage that the measuring probe chamber is formed from several partial chambers.

An advantageous embodiment of the invention envisages that the measuring probe chamber is formed from an inner and an outer measuring probe chamber.

An advantageous embodiment of the invention envisages that a volume enclosed by the measuring probe chamber can be adjusted.

In a further development of the invention, a fluid channel can be provided, which is in fluid connection with an internal space of the measuring probe chamber and is configured for carrying the liquid into the measuring probe chamber and out of the measuring probe chamber. This makes it possible to set and control a particular liquid level in the internal space. Fluid channels can be provided, which are designed as inlet channels and outlet channels. The one or more fluid channels are preferably formed in side walls of the measuring chamber, advantageously in a section near the bottom, and outlet channels are preferably arranged lower down than inlet channels.

One embodiment of the invention envisages that the measuring probe chamber is made at least section by section from an optically transparent material.

A preferred embodiment of the invention can envisage that the measuring probe is secured to the measuring probe holder but is detachable.

An advantageous embodiment of the invention envisages that the measuring probe is a cantilever.

Preferred embodiments of the measuring cell for receiving a liquid specimen for a probe microscope are explained below.

In an advantageous embodiment of the invention, further fluid channels are provided, each of which is in fluid connection with at least one of the several measuring cell chambers.

One embodiment of the invention envisages another fluid channel, which is in fluid connection with the several measuring cell chambers.

A preferred embodiment of the invention can provide evaporation protection, which is configured to seal the internal space during a probe microscopic measurement.

An advantageous embodiment of the invention envisages that one or more upward-curved segments are formed in the region of a bottom.

In the following, further preferred embodiments are described, which can optionally be applied, individually or in combination, to the measuring probe device or the measuring cell or both. The details presented apply correspondingly to any measuring probes of probe microscopes, i.e. not only to cantilevers.

In a possible embodiment, a device/coating is provided for obtaining a liquid bell around the cantilever, which corresponds to a surface topography of the specimen substrate and owing to a suitable geometry, multiplication and arrangement of individual measuring chambers, facilitates changing of the probe-microscopic measuring device from one measuring chamber to another and can be used advantageously for automating specimen characterization.

It can be envisaged that when the cantilever with the measuring probe is removed from the measuring chamber to which liquid has been added, a sleeve on the underside of a cantilever holder makes liquid breakaway so gentle that the physical-mechanical loading of the cantilever and in particular of the measuring probe is so slight that repeated use is possible.

Typically the sleeve extends beyond the dimension of the cantilever and the measuring probe. Nevertheless, to execute sampling with the AFM tip, in one embodiment it is envisaged that the bottom of the measuring chamber has a topography corresponding to the sleeve, for example in the form of a trapezium or a truncated cone, to reduce the contact between cantilever and specimen. This topography can be produced by methods such as injection moulding or LIGA techniques. Alternatively it is also possible that in the simplest case only one suitable platform is formed, for example by using a planar glass slide.

It can also be envisaged that the topographical design of the measuring chamber is optically transparent, which permits microscopic observation of the specimen and measuring probe and has biocompatible properties. This is preferred in particular for use in the life science area.

The sleeve itself can consist of flexible or less flexible material. A flexible material can make it possible that when mounted on the bottom of the measuring chamber, compression takes place, so that the cantilever with the measuring probe can make contact with the specimen for measurement. Therefore the dimension of the topographical elevation can also be reduced or it can be omitted completely. It is also possible for the sleeve to have a heterogeneous composition. This relates not only to the vertical or horizontal structure, but also to the number of sleeve-lips. It is thus possible that an outer sleeve differs in composition and geometry from a second inner sleeve. The outer sleeve can be used mostly for the fluidic sealing, whereas the inner sleeve serves more for obtaining an aqueous environment around the cantilever during the reaction.

Furthermore, it can be envisaged that both the material of the sleeve itself and the base of the cantilever holder are chemically modified so that the formation and stability of a liquid bell around the measuring probe are improved. Thermoreversible polymers (NiPAM), which are also called hydrogels, are known for certain temperature characteristics they display a change from hydrophobic to hydrophilic. On this basis, the adhesion of cells can be controlled as a function of temperature. Furthermore, a temperature-dependent volume change can also take place, for example the hydrogel from the company GeSiM shrinks by 90% when the temperature rises by 5° C., accompanied by mechanical hardening. It can be envisaged, by using hydrogels in the sleeve material and/or in the region of the underside of the cantilever holder, to provide control of their physicochemical properties such as volume, strength, and hydrophobicity. Moreover, it is also possible to provide not only the sleeve or the hydrogel covering on the cantilever side, but also to have, at the level of the specimen substrate, a sleeve-shaped construct, which optionally forms a border round the topographic structure.

It can also be envisaged that the sleeve is formed so that it produces a bell effect. This can have the result that when the cantilever holder is immersed into the liquid, air bubbles are trapped above the measuring probe and disturb probe measurement and optical observation, or even make them impossible. For this reason, a fluidic feed on the cantilever holder is proposed, which firstly makes it possible to draw off the air bubble as it forms. Then a liquid can also be supplied or withdrawn through this feed line. It is envisaged in one embodiment to deflect the nascent air bubble sideways by suitable shaping of the underside of the cantilever holder, so that a pump is not required. Furthermore, there can also be several independent channels of this feed line. It is also advantageous if particles are introduced, for example as measuring probe, through at least one channel.

It can also be envisaged that, independently of the aforesaid feed line in the cantilever holder, another fluid feed is introduced into the measuring chamber. This is advantageous in particular for separate addition of cells and active substances. It is proposed, for example, that this fluid feed divides into at least two independent supply lines and one outlet. Typically, microparticles used as measuring probes or target specimens often have a size from about 2 μm to about 50 μm. Therefore they settle relatively quickly, even within the fluidic supply lines, and can then only be removed with difficulty, with copious amounts of rinsing agent, if for example a rinsing operation or addition of active substance is necessary after addition of the particles. This design avoids the disadvantage of existing fluid cells for AFM operation, which do not provide separate feed of microparticles and pure liquids.

Moreover, it can be envisaged that the aforesaid properties of the measuring space such as multi-channel feed and topographic structure apply not only to a solitary measuring chamber, but also in the case of a collection of chambers. In one embodiment it is proposed that the partitions of the chambers have flatter partitions than the outside walls. The separate measuring chambers can be filled fluidically separately. If the level exceeds the height of the partitions, the latter are in a so-called fluidic continuum. In this way the measuring probe can also be moved from one measuring chamber to the next, without leading to pronounced mechanical loading, especially of the measuring probe. In one embodiment of these corresponding measuring chambers it is also possible that not all units of the multichamber communicate with one another fluidically. It is proposed, in a concrete embodiment, that a chamber consists for example of three subunits with a chamber for the specimen particles and for the probe particles and a region for holding separated cantilever measuring probes or waste. This triple unit can also be designed so that a uniform measuring space is structured by means of partitions, so that the regions are arranged next to each other or like segments of a circle. The advantage of spatial separation of particles for the measuring probe and for the AFM sampling is that prior interaction of the two types is prevented and incubation with an active substance does not necessarily act on both types.

By introducing a third region for holding separated cantilevers or otherwise such as deposited probe particles it is possible to recover them more easily, so that objects located thereon can be used further for subsequent analyses. Especially for living cells, in this way subsequent cultivation is possible. If a cell or a cell cluster is applied as a measuring probe, on incubation in a culture medium and with suitable external conditions such as temperature (for example 37° C.) and gas treatment (for example 5% $CO_2$), cell division begins. Adherent growing cells are typically motile with speeds of movement in the μm/s range, so that with suitable coating of the plate substrate the cells move spontaneously from the cantilever or parts thereof.

It can also be envisaged that the cell intake has an array-like substructuring. In this way the rather random distribution of the cells from the specimen or of the particles for the measuring probe is removed and transferred into an ordered holding zone. This facilitates locating the objects and automatic sampling. For example, the specimen intake can have a row and column arrangement of pores with a diameter smaller than the size of the individual specimen. By applying a vacuum, the suspended objects are sucked onto the pores and retained, as is known from the planar patch-clamp technique. Objects outside of the pores can be washed away by a crossflow. Positioning can also be effected using overpressure. Pumps are typically used for generating the pressure.

The array-like positioning of the objects can alternatively also be effected by micro-spotting of the objects by means of a dispenser. This method is especially attractive when the topographic uptake is covered with an array-like matrix of substances, which promote (for example polylysine) or inhibit (for example polyHEMA-poly-hydroxyethyl methacrylate) the addition of micro-objects, in particular cells. The standard method of preparing such a matrix is by spotting or contact printing (for example nano- or micro-imprinting).

When transferring the cantilever from one measuring space to the next, the relative movement can be performed both by moving the cantilever holder and by changing the position of the measuring space, or by mutual movement.

For the long-term stability of the analysis it is important that evaporation is as low as possible. To make this possible, it is proposed to cover the measuring chambers with evaporation protection during measurement. This is achieved for example with a ring around the cantilever holder, which seals the measuring chamber directly in use and some areas around it. If larger regions are to be covered, a plate is proposed. This plate can for example slide by a spring-loaded device over the regions that are not in use.

The preceding explanations, insofar as they relate to a particular type of probe microscopy, for example AFM, apply to other methods of probe microscopy correspondingly, especially methods of measurement by scanning probe microscopy and the relevant devices.

DESCRIPTION OF PREFERRED EXAMPLES OF THE INVENTION

Figure 1:
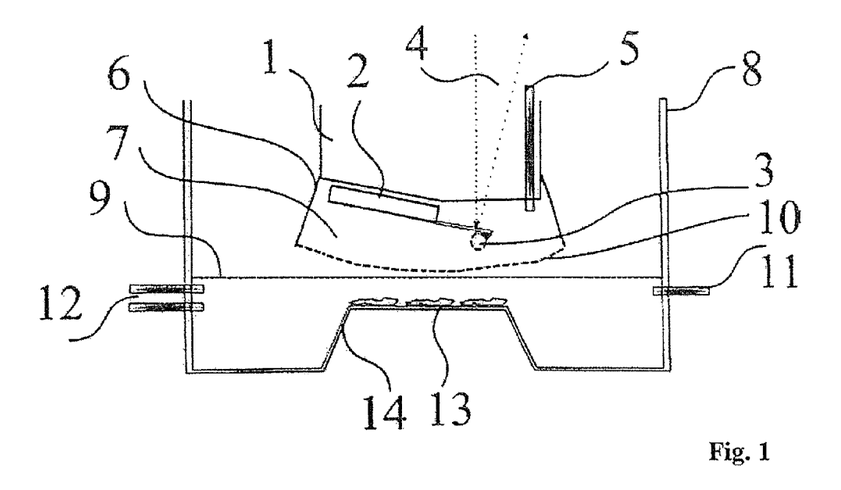
FIG. 1 a schematic illustration of an arrangement with a measuring probe and a measuring cell, FIG. 2 a schematic illustration of an arrangement with several measuring chambers, between which internal separating elements are arranged, shown in cross-section, FIG. 3 a schematic illustration of an arrangement with several measuring chambers with different compartments for specimen, measuring probe and probe holding zone, in a top view, FIG. 4a a schematic illustration of an arrangement with a measuring cell and a measuring probe arranged therein, for describing the formation of a liquid bell, FIG. 4b a schematic illustration of the arrangement in FIG. 4a, showing meniscus formation in a transfer position from a first measuring chamber, FIG. 4c a schematic illustration of the arrangement in FIG. 4a, showing meniscus formation in an immersion position of a second measuring chamber, FIG. 5a a schematic illustration of another arrangement of measuring chambers with different compartments for specimen, measuring probe and probe holding zone, in a top view, FIG. 5b a schematic illustration for further subdivision of the specimen space by an array formation, FIG. 6 a schematic illustration of an arrangement with a multiple cantilever and an array formation with corresponding geometry and FIGS. 7a to 7d a schematic illustration for describing measuring probe transfer without sleeve with scheduled liquid change.

The invention is explained in more detail below on the basis of examples and referring to figures in the drawings, showing:

FIG. 1 shows a schematic illustration of an arrangement with a cantilever design of measuring probe 2 and a measuring cell 8.

The end of a cantilever holder is an optically transparent material 1 on whose underside the cantilever 2 (with bending beam and tip) is mounted. The tip is already loaded with a measuring probe particle 3. The deflection of a laser beam 4 is detected and characterizes the xyz-position of the front portion of the cantilever. A fluidic feed line 5 allows liquid 7 to be brought into or to be withdrawn from the vicinity of the cantilever. This feed line can also be used simultaneously for removing a disturbing air bubble located on the underside of the cantilever holder. Owing to a sleeve structure 6, the cantilever can even be surrounded with liquid in a position above the liquid level 9 of the measuring cell 8. It then forms its own meniscus 10. It is advantageous if, through surface coating of the cantilever holder and in particular of the sleeve 6, a large volume of liquid can accumulate. The measuring chamber 8 is provided with separate fluidic supply lines 12 (for example two) and an outlet 11, so that liquid can be replaced and the level 9 can be altered independently of the feed line 5. In this way it is possible to control a liquid level in the measuring chamber 8.

So that the contact between the cantilever and the specimen cells 13 is not disturbed by the height of the sleeve 6, the bottom of the chamber is of platform-like design 14. The measuring chamber is preferably made of plastic, so that such structuring can be implemented technically easily. When the sleeve consists of a flexible material, structuring of a platform may be unnecessary.

Figure 2:
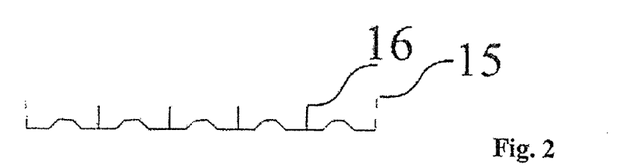

FIG. 2 shows a schematic illustration, in cross-section, of an arrangement with several measuring chambers, between which internal separating elements are arranged. In the design shown, an outer edge 15 of the measuring chamber is significantly higher than partitions 16, in order to keep the z-lift of the cantilever small.

Figure 3:
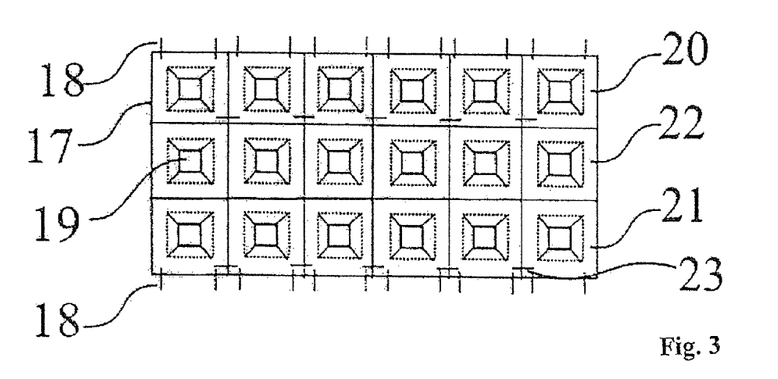

FIG. 3 shows a schematic illustration of an arrangement 17 with several measuring chambers, which are designed according to measuring chamber 8 in FIG. 1, with different compartments for specimen, measuring probe and probe holding zone, in a top view.

Fluidic contacts 18 are indicated schematically. The trapezium-like internal shape 19 symbolizes a platform arrangement. A design is formed in which one row has specimen cells 20, one row has probe cells 21 and a middle row functions as a holding zone 22. Such a triple cluster or such a subunit (columns) can be formed with reduced partitions, whereas when contiguous with another cluster, the delimiting walls are higher than the partitions of the subunits.

If a cantilever is to be separated or if the measuring probe is to be replaced, this can take place in the holding zone 22. The individual measuring chambers can additionally be linked together by fluidic connections 23. This connection does not have to be continuous, but can also for example only link two adjacent measuring chambers in each case. Control by means of miniaturized valves is also possible. The order of the design with chambers for the specimen, for the probe and the holding zone can also be carried out in some other combination, for example holding zone, specimen and probe.

Figure 4A:
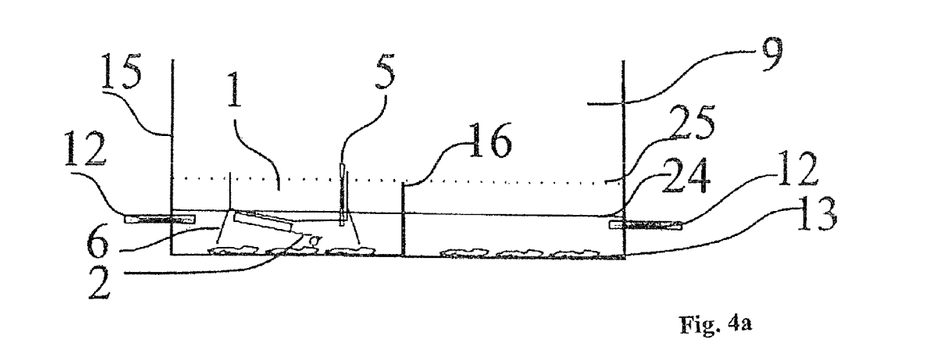

FIG. 4a shows a schematic illustration of an arrangement with a measuring cell and a measuring probe arranged therein for describing the formation of a liquid bell.

A measuring chain consists in this example of two measuring chambers 9, which are separated by a partition 16, with 16 lower than the outside wall 15. The cantilever holder 1 with a fluidic capillary 5 and the cantilever 2 is surrounded by a sleeve 6, the size of which can be shorter or longer than the cantilever tip plus probe. The probe is positioned above the specimen 13. The system is filled up to a liquid level 24, which can also be different for the separate measuring chambers. An imaginary virtual line 25 denotes the limit above which the measuring probe including the sleeve can pass by the partition 16 without contact.

Figure 4B:
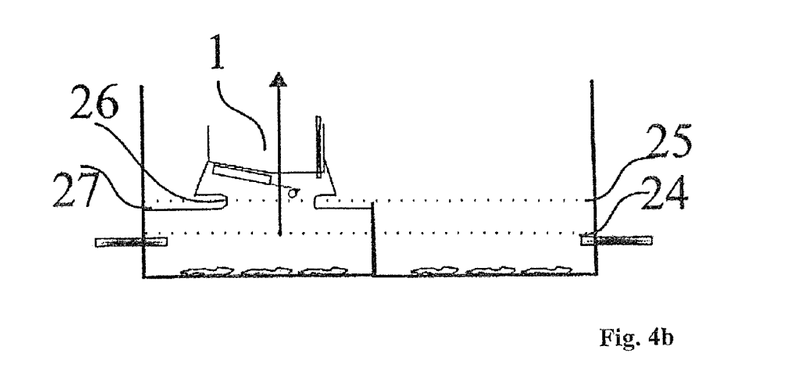

FIG. 4b shows a schematic illustration of the arrangement in FIG. 4a, showing meniscus formation in a transfer position from a first measuring chamber.

It can be seen that the optically transparent material 1 was moved from the measuring chamber (arrow). This can take place by motorization of the cantilever holder itself, with a usual motorization path of <200 µm or by using servomotors. More simply, however, a z-lift can be effected by a cam lift, if the liquid levels and hence the lifting movement do not need to be altered in incremental steps. There is then formation of a meniscus 26 between the liquid of the measuring chamber and in the region around the measuring probe. The lift must be large enough for the cantilever tip with the sleeve to project beyond line 25. If the lift is too high, the meniscus may be disrupted. To avoid this, in addition the lifting movement is associated with an increase in the liquid level 27 in the measuring chamber. This can take place independently of the filling level of the second measuring chamber.

Figure 4C:
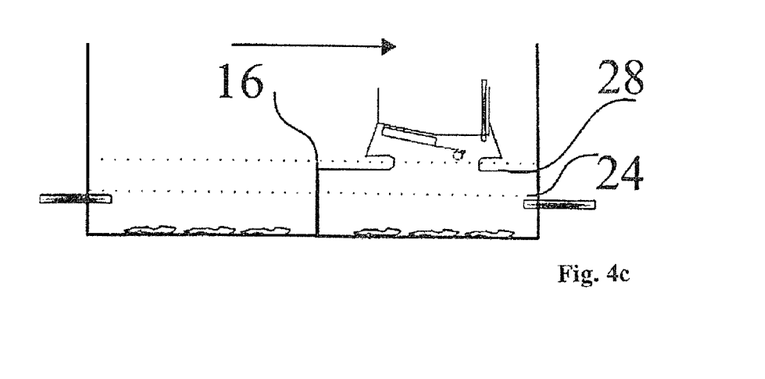

FIG. 4c shows a schematic illustration of the arrangement in FIG. 4a, showing meniscus formation in an immersion position of a second measuring chamber.

This is effected for example by movement of the specimen holder. If, during this movement, the measuring probe approaches the partition 16, the liquid level in the measuring chamber 1 is lowered to 24 and at first the liquid level of the second chamber is raised 28. In parallel with lowering of the measuring probe onto the specimen 13, the liquid level of the second chamber is also lowered again to 24.

Figure 5A:
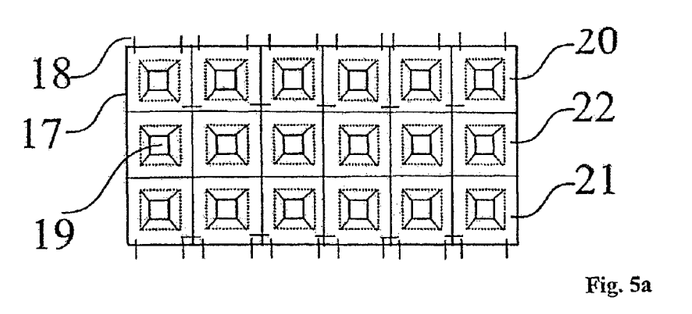

FIG. 5a shows a schematic illustration of another arrangement of measuring chambers with different compartments for specimen, measuring probe and probe holding zone, in a top view. The intention is to facilitate the locating of particles for the measuring probe and for the sampling (specimen cells). Alternatively the pore formation shown can also be used for regulating the liquid level.

FIG. 5a describes an illustration relating to FIG. 1 with array-like arrangement 17 of measuring chambers in top view with fluidic contacts 18 shown schematically. The trapezium-like internal shape 19 symbolizes the platform arrangement. A design is proposed in which one row has specimen cells 20, one row has probe cells 21 and the middle row functions as a holding zone 22. If a cantilever is to be separated or if the measuring probe is to be replaced, this can take place in 22. The individual measuring chambers can additionally be linked together by fluidic connections 23. This connection does not have to be continuous, but can also for example only link two adjacent chambers in each case. Control by means of miniaturized valves is also possible.

Figure 5B:
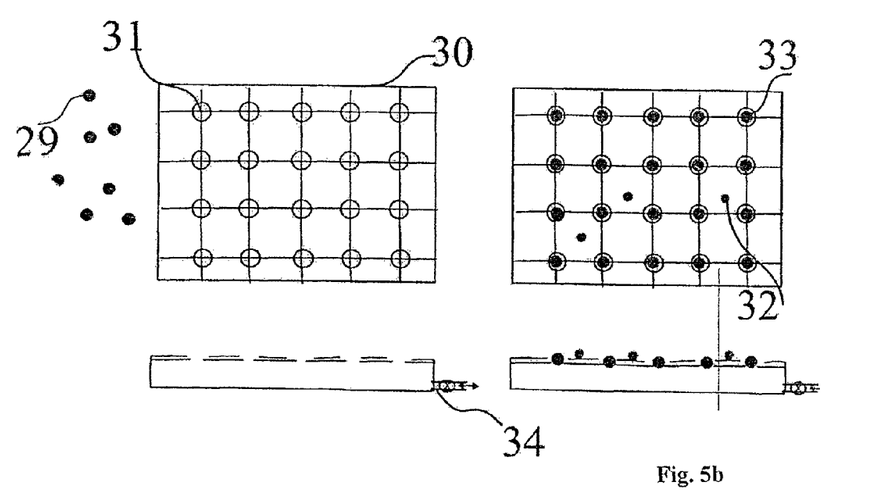

FIG. 5b shows a schematic illustration of the further subdivision of the specimen space by means of an array formation.

The internal space 19 is of trapezium-shaped design in the embodiment shown. In a measuring chamber 30, there are pores 31, a defined distance apart, which form an array. The measuring chamber is connected fluidically so that by means of a combination of valves and pumps 34, a suction pressure can be induced via the pores. On adding particles 29, the particles are sucked to the free pore sites, resulting in formation of an array-like arrangement of particles 33. Alternatively, placement can also be produced with overpressure, or the array of pores can be cleaned. Furthermore, any excess particles 32 are deposited on intermediate areas. These can then be flushed away, whereas the placed objects 33 remain locally stable owing to pressure. Preferably the fluidic contacting is designed in such a way that loading row-by-row or column-by-column is possible.

Figure 6:
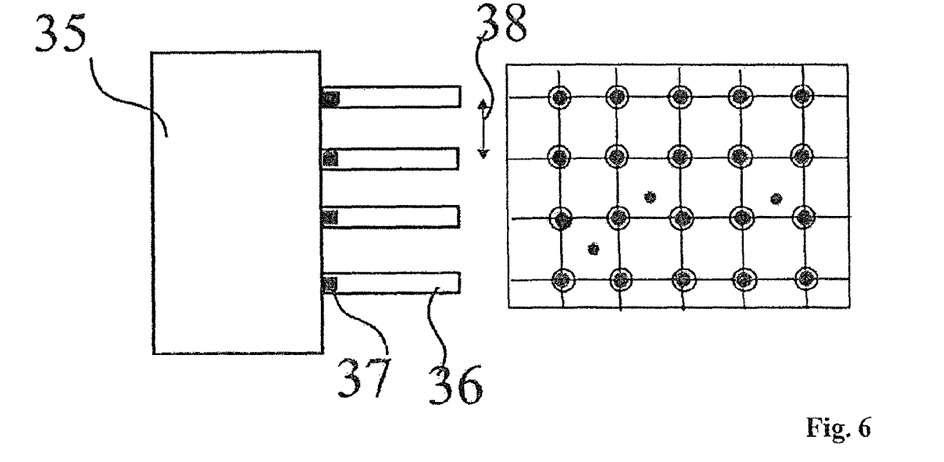

FIG. 6 shows a schematic illustration of an arrangement with a multiple cantilever and an array formation with corresponding geometry. An AFM measuring probe consists typically of a main body 35 and cantilever 36 with an additionally fitted piezo-positioning element 37. Preferably, in a multicantilever, the bending beam distance 38 should be equal in size to the corresponding array distance.

FIGS. 7a to 7d show a schematic illustration for describing a measuring probe transfer without sleeve with scheduled liquid change.

Figure 7A:
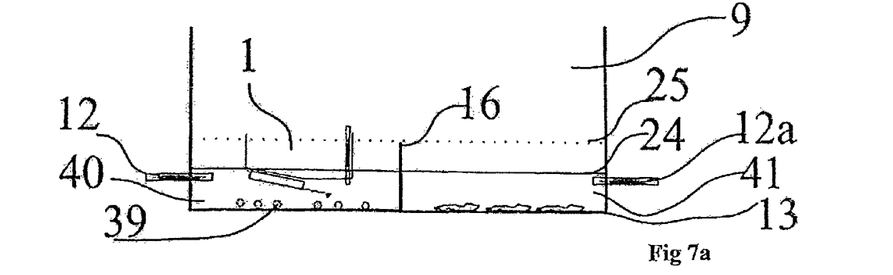

According to FIG. 7a, a measuring chamber 9 is subdivided into two partial regions, which are separated by a partition 16. Each said partial region has at least one fluidic feed 12, 12a, which can be operated independently of one another and both sucks and pumps. The partial regions are filled up to a liquid level 24, and the preparation solution 40 contains particles 39 for use as measuring probe, whereas the measuring solution 41 contains specimen objects 13. Line 25 characterizes the height, which the cantilever with the measuring probe must pass the partition 16, so as not to come into mutual contact.

Figure 7B:
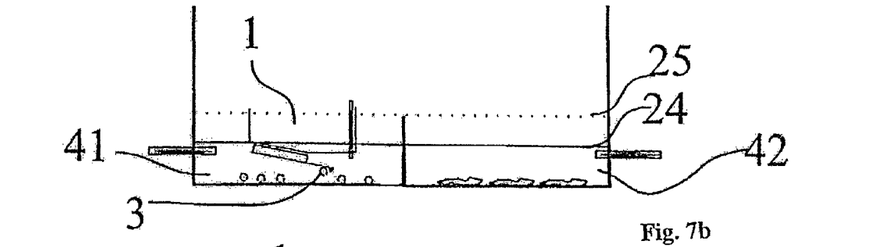

In FIG. 7b, a particle 39 is coupled to the cantilever, therefore this becomes the object for a measuring probe 3. Then the two partial regions are rinsed, so that an essentially identical fluid is contained in 41 and 42.

Figure 7C:
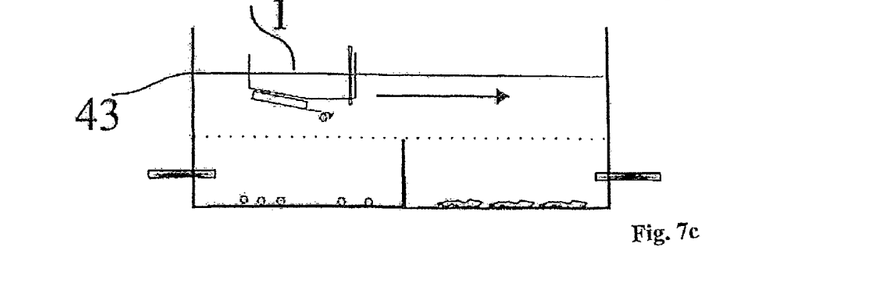

In FIG. 7c, the measuring chamber 9 is flooded above the height of the partition 16 and up to a liquid level 43. Accompanying the rise in level, the distance between cantilever holder and particle 39 is increased. Next, the cantilever is positioned over the second partial region (arrow).

Figure 7D:
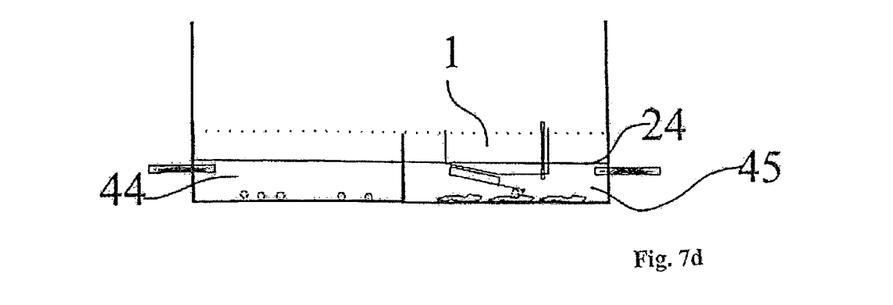

In FIG. 7d, the liquid level 43 is lowered to the original level 24, accompanied by lowering of the cantilever holder with the measuring probe to a working position in the vicinity of the specimen particles. Additionally, the liquid is changed, so that once again there are individual solutions 44, 45 in the two partial regions.

The features of the invention disclosed in the above descriptions, the claims and the drawing may be important both individually and in any combination for the implementation of the invention in its various embodiments.

The invention claimed is:

1. A measuring probe device for a probe microscope, in particular a scanning probe microscope, with a measuring probe holder and, arranged on the measuring probe holder, a measuring probe, which is set up for a probe microscopic investigation of a sample, wherein on the measuring probe holder, a measuring probe chamber is formed, which receives the measuring probe at least partially and is open on a side away from the measuring probe holder, and is configured to receive a liquid surrounding the measuring probe, wherein the measuring probe chamber is configured to hold a liquid when separating the measuring probe chamber from a liquid level in which the sample to be examined is arranged, such that the measuring probe is completely covered by the liquid when the measuring probe chamber is separated from the liquid level.

2. The measuring probe device according to claim 1, wherein the measuring probe chamber has a sleeve structure.

3. The measuring probe device according to claim 1, wherein the measuring probe chamber is configured to form, with the liquid that is to be received, a liquid bell surrounding the measuring probe.

4. The measuring probe device according to claim 1, wherein segments of the wall of the measuring probe chamber are made at least partially of a flexible material.

5. The measuring probe device according to claim 1, wherein segments of the wall of the measuring probe chamber have, at least partially, a hydrophilic surface coating at least on an inside surface.

6. The measuring probe device according to claim 1, wherein the measuring probe chamber is formed with several partial chambers.

7. The measuring probe device according to claim 5, wherein the measuring probe chamber is formed from an inner and an outer measuring probe chamber.

8. The measuring probe device according to claim 1, wherein a volume enclosed by the measuring probe chamber can be adjusted.

9. The measuring probe device according to claim 1, wherein a fluid channel, which is in fluid connection with an internal space of the measuring probe chamber and is configured for introducing the liquid into the measuring probe chamber and for carrying it away from the measuring probe chamber.

10. The measuring probe device according to claim 1, wherein the measuring probe chamber is made at least in some sections of an optically transparent material.

11. The measuring probe device according to claim 1, wherein the measuring probe is removably fastened to the measuring probe holder.

12. The measuring probe device according to claim 1, wherein the measuring probe is a cantilever.

13. A scanning probe microscope with a measuring probe device according to claim 1.

* * * * *